Oct. 25, 1960  E. A. MATHIAS ET AL  2,957,344
DYNAMIC THRUST METER
Filed Oct. 30, 1956

INVENTORS
EMIL A. MATHIAS
WARREN W. INGLIS
BY
*W. E. Thibodeau, a. W. Dew & H. I. Forman*
ATTORNEYS

United States Patent Office 2,957,344
Patented Oct. 25, 1960

2,957,344

DYNAMIC THRUST METER

Emil A. Mathias, Cheltenham, Pa., and Warren W. Inglis, Maple Shade, N.J., assignor to the United States of America as represented by the Secretary of the Army Filed Oct. 30, 1956, Ser. No. 619,367

1 Claim. (Cl. 73—141)

(Granted under Title 35, U.S. Code (1952), sec. 266)

The invention described herein may be manufactured and used by or for the Government for governmental purposes without payment of any royalty thereon.

This invention relates to an apparatus for measuring the static or dynamic thrust. It has broad application. It was designed for measuring the dynamic thrust of catapults, removers and thrusters, such for example as are used on aircraft for ejection of a load, canopy or a seat or for moving a load or seat within an aircraft before ejection. It can be used for the measurement of dynamic forces on all applications. Example: It can be used for the dynamic weighing of trains and individual cars on railways and highways. It can be used to measure the output of stone and coal crushers. It can be used to measure the thrust of fluids, gas, oils, kerosene, waters. It can also be used for static weighing, the calibration of hydraulic and mechanical presses, universal testing machines, etc. As it applies to dynamic thrust measurements it is self calibrating under dynamic operation due to the fact that the ring is sufficiently thick that it possesses a natural frequency higher than the loads applied, giving a temporary distortion due to dynamic load equal to that resulting from a static load, and an object to provide a reliable and accurate device of this class, something that has not existed heretofore in the face of a long existing need.

Prior efforts have broadly included two essential elements, namely an absorber to receive the thrust or force and become distorted thereby, and a transducer to change mechanical distortion of the absorber into an electrical value capable of being measured. The closest known prior art has included a metal column short enough not to be flexed but rather to have the column diameter bulged outwardly under compression below the elastic limit. Strain gages in about the middle of the column have been used to measure the increase in diameter in an electrical unit. The chief difficulty with this proposal has been the lack of accuracy, of uniformity and reproducibility of results where the devices are under calibrated static loads and used under dynamic loads. An investigation has been made into the causes of this, closest prior art apparatus being unreliable. It cannot be directly calibrated using a primary standard but has necessitated the use of an intermediate or secondary standard which in turn has to be compared to the more reliable primary standard. In the event the load should not be applied exactly axially, the column may flex instead of bulge in compression. Possibly a slight peening action is likely to occur at the contact surface of the column even though the thrust be kept below the elastic limit of the column. A strain gage has to be secured to the column surface using some different bonding material with the result that slight delay action occurs within the joint which is impossible to prevent. The strain gage is adapted for a change in length of only 10% to 13% of its original length. It is usually designed to operate near that limit to obtain the best results. Yet, an overload will often elongate the strain gage beyond tis elastic limit causing a permanent set and destroying its use and calibration.

There are many kinds of thrust absorbers and transducers on the market but none of them was suitable to measure dynamic forces with reliable results. Since no absorber on the market was suitable, no combination of an absorber with a transducer could be expected to be satisfactory. No transducer could be expected to possess a compensating error or factor that is always equal and compensating to whatever error the absorber possesses. No lever or leaf spring type of absorber was appropriate because accuracy with static loads required knife edges for precision in location of the forces applied and the dynamic thrust is practically certain to destroy a knife edge capable of withstanding an equivalent static thrust. Any proving ring type of absorber on the market was found to be unreliable in results in that it was unable to take the dynamic loads applied without either distorting or dangerously vibrating. A piezoelectric type of absorber was also found to be unsuitable. A magnetostricto absorber possessed no straight line characteristics between input and output and in addition required too large a mechanical movement. Inasmuch as the need for a dynamic thrust measurement with satisfactory reliability had existed for more than a few decades, the prospect of attainment of reliable results seemed hopeless.

According to the present invention, a proving ring was made to possess a natural frequency well above the frequency range of the applied load. Specifically, a reliably accurate thick, proving ring was built to have what was thought to be a suitably high natural frequency 4,000 cycles per second and minute deflection characteristics. A transducer sensitive to small mechanical movements, one having a straight line characteristic when input is plotted against output, one having no delay action or lost motion in it, and one capable of taking a substantial overload without losing its accuracy of calibration was sought. The need for all these foregoing desirable qualities in a transducer was not appreciated until after the seeming hopelessness of finding a satisfactory absorber had been passed. A transducer of this sort was found to exist in an electron discharge tube having a movable plate pivoted in a diaphragm closing one end of the tube.

Referring to the drawing.

Figure 1:
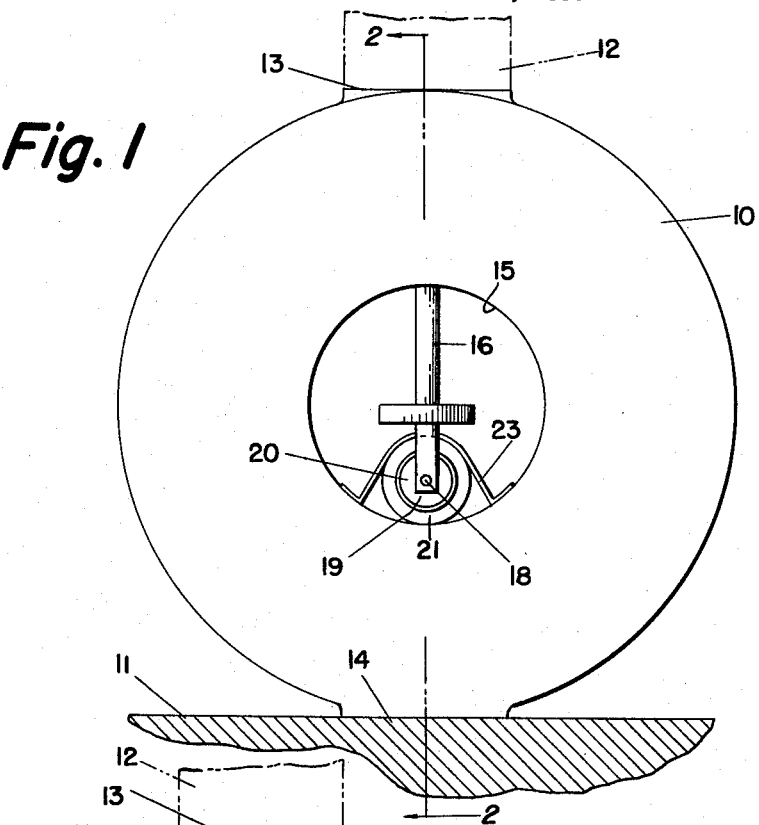
Fig. 1 is a left side view of the combination disclosed in Fig. 2.
Figure 2:
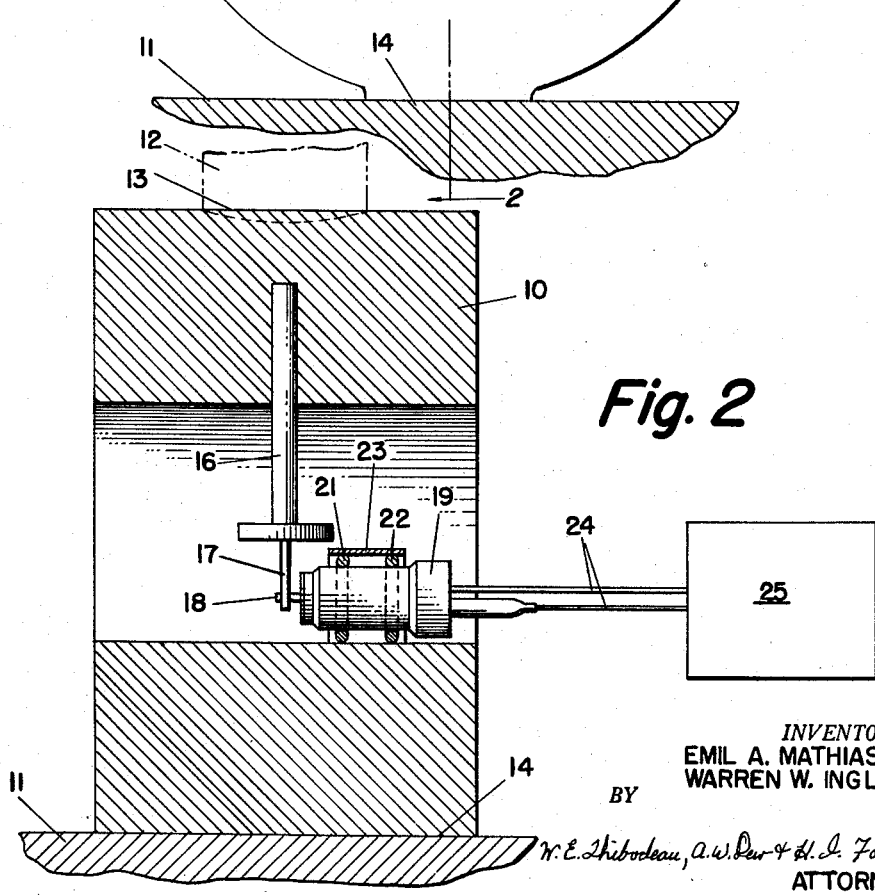
Fig. 2 is a section on the line 2—2 of Fig. 1.

Studies suggested the desirability of making the proving ring 10 much thicker in diameter to have a far higher natural frequency than did any of the commercial and available proving rings on the market inasmuch as those rings were usually used for static loads where the question of a resonant frequency is not important. This ring 10 is of the usual chrome-vanadium alloy steel having a tensile strength of at least about 235,000 lbs./sq. inch in ultimate strentgh. The one illustrated is 3¼ inches high, and has a ratio of boss area at the top and bottom to the radial cross-sectional area of about 1:24 instead of the usual ratio of 1:8 or 1:10 found in the prior art proving rings. Its radial thickness is about 1 inch and its width is, as shown in Fig. 2, about 2 inches. The dimensions are not too important so long as the natural frequency of the proving ring is well above the frequency which a dynamic load may tend to induce on being absorbed by the proving ring. How large a thrust or force this ring can stand when the load is dynamic and still have the period safely below the resonant frequency of the ring is not known. This ring is intended to measure loads of as much as 10,000 lbs. stopped in as short a time as 1/1000 to 1/10,000 of a second. The ring is mounted on a substantially rigid support 11. The thruster, remover, or catapult, 12, is of the cartridge actuated type or any other static or dynamic item, and is initially in contact with the proving ring before being fired. The top and bottom bosses 13 and 14 respectively, are smaller than is indicated in the drawing, being only about 7/8 of an inch in diameter. Too large a boss area tends to change the characteristics of the proving ring. The central hole 15 is about 1¼ inches in diameter. The steel stem 16 is securely fitted into the proving ring. Inasmuch as threads are likely to possess a slight lost motion they are unsuitable and instead the stem was found to be most securely fixed to the ring with a tight shrink fit. A hole in extension 17 into which is inserted and soldered a circular plate extension 18 was found appropriate in transmitting movement of ring deflection to a plate extension 18 from the movable plate of the electron discharge tube or transducer, 19. This eliminates high stresses and metal distrotion characteristics which are inherent in the use of a knife edge even under low load.

This transducer is of the movable plate type electron discharge tube manufactured by RCA and bearing catalogue No. 5734. The movable plate is pivoted in the stationary diaphragm 20 closing an end of the tube and this particular transducer has the movement of its plate 18 so limited that the plate should not possess a movement of more than half a degree or 30 minutes. Some appropriate type yieldable support or supports 21 are provided under the transducer 19 also over it at 22 inasmuch as the strap 23 holds the transducer in place within the proving ring. The yieldable supports 21 and 22 are of O ring material although other types may be appropriate. Terminals 24 from the transducer lead to any appropriate recording equipment 25 capable of indicating value of voltage change. More specifically, the voltage output from the transducer is fed to a dual beam oscilloscope, not illustrated, and forming no part of the present invention and appears as a trace on the screen of the oscilloscope. One beam of the oscilloscope is influenced by the voltage output from the transducer 19 and makes a trace which indicates that voltage change while the other beam is influenced by the voltage within the scope and makes a standard time trace of 1/1000 of a second. Because the movement of the transducer plate is so slight and so rapid and because the traces of the scope are of short duration, a camera such for example as a Fairchild or a Dumont high speed camera is used to photograph the scope screen thereby recording the traces shown on a moving film after the moving film has been developed and to read the actual thrust or force value to determine the acceptability of the device whose thrust is being measured.

Among the advantages of this invention may be mentioned the development of a new type proving ring having a natural or resonant frequency well above any frequency which may be imparted to the ring by a dynamic load in being stopped. The high natural frequency of the ring is desirable in that the ring will deflect and dampen out without vibrating when dynamic loads impress frequencies below the natural frequency of the ring. So far as is known this is the first time the desirable quality of a proving ring to absorb dynamic thrusts and also be capable of being accurately calibrated statically has been demonstrated. The advantage of employing the proving ring principle is that a device for calibrating other accurate measuring devices is being employed directly for the measurement of dynamic or static loads. Instead of measuring a downwardly applied load as indicated in the drawing, a suitable hook may be securely fastened to the proving ring for attachment of an upwardly applied dynamic thrust. In either case the proving ring is adapted to possess the usual and nearly opposite and equal compression and tensional stresses within it. The small boss area is a desirable feature. A failure to have the load applied exactly in the center of the ring is not as serious as is that danger in a column type absorber where the column is likely to bend or flex instead of being compressed. In this proving ring any tendency for one portion of the ring to flex more than the other is thought to be compensated for by the fact that the ring transmits the load equally as a curved beam. In one sense this proving ring does not need as precise locations for applying the dynamic load as is the case with other absorbers. The circular geometry of the ring acting as a curved beam on either side of the line of contact acts as a self-centering force equalizer. The transducer measures only a change in voltage. In the present case, the normal movement is much less than the permissible half a degree for the plate 18 with the result that this meter is well adapted to withstand a substantial overload of approximately 30% without danger of the transducer being injured by plate movement up to its permissible half a degree. Where found desirable, suitable voltage amplifying means may be used in the output circuit 25. This is the first reliable meter for measuring dynamic forces or thrusts and capable of reproducibility in the measurement without the need for frequent re-calibration at special laboratories. Reproducibility in measurement refers to repeated use, and to one skilled in the art the ability to be used over and over again signifies that the stresses induced are well below the elastic limit of the material. An advantage in having the transducer 19 located as shown in Fig. 2 of the drawing between the side faces of the proving ring is the fact that the dynamic thrust meter of this invention is able to be calibrated with static loads and found correct for dynamic load measurement, thus making this meter unique in being practically self calibrating. One reason for this new result is because some dynamic loads are accompanied by a shock wave which is in addition to the load transmitted by the thruster or catapult 12. Were the transducer 19 located outside of a space between the side faces of the proving ring, such transducer would be influenced by such a shock wave and not read as accurately as it does when located as shown. Some applications of dynamic loads may be accompanied by heat or pressure waves from a burning propellant. Locating the transducer within a central hole of the proving ring is a substantial protection against all waves which may accompany but are not the dynamic load itself. The transducer must be small in order to be housed within a short hole as illustrated which has a diameter of about 1¼ inches.

We claim:

In a device for measuring dynamic loads in both tension and compression stopped in 1/10,000 to 1/1,000 of a second, a load absorbing proving ring, said ring being of generally cylindrical shape having end faces and being provided with an axial hole, said ring being further provided with external oppositely extending load application bosses, the ratio of outside diameter to inside diameter of said ring being about 2.6:1, the ratio of load application boss area to radial wall cross-sectional area being about 1:24 in said proving ring, and a transducer of compact type located within said axial hole in said proving ring, said hole being as small as about 1¼ inches in diameter and said transducer being entirely between the planes of the side faces of said proving ring, whereby said transducer is substantially protected against any shock or other waves incident to travel of a dynamic load and whereby said proving ring has a natural frequency of resonance above the frequency generated by an applied dynamic load.

References Cited in the file of this patent

UNITED STATES PATENTS

| | | |
|---|---|---|
| 2,323,724 | Nadai et al. | July 6, 1943 |
| 2,576,417 | Ruge | Nov. 27, 1951 |
| 2,611,266 | Wiancko | Sept. 23, 1952 |
| 2,776,561 | Brown | Jan. 8, 1957 |